United States Patent [19]

Mueller et al.

[11] Patent Number: 4,932,980
[45] Date of Patent: Jun. 12, 1990

[54] POLYMERIC FLUIDIZER FOR MIDDLE DISTILLATES

[75] Inventors: Michael Mueller, Alsbach-Haehnlein; Horst Pennewiss, Darmstadt, both of Fed. Rep. of Germany

[73] Assignee: Röhm GmbH, Darmstadt, Fed. Rep. of Germany

[21] Appl. No.: 223,793

[22] Filed: Jul. 25, 1988

[30] Foreign Application Priority Data

Jul. 29, 1987 [DE] Fed. Rep. of Germany ....... 3725059

[51] Int. Cl.⁵ .............................................. C10L 1/18
[52] U.S. Cl. ...................................................... 44/62
[58] Field of Search ............................................ 44/62

[56] References Cited

U.S. PATENT DOCUMENTS

| | | | |
|---|---|---|---|
| 3,048,497 | 8/1962 | Ilnyckyj et al. | 44/62 |
| 3,404,091 | 10/1968 | Takashima et al. | 44/62 |
| 3,567,639 | 3/1971 | Aaron et al. | 252/56 |
| 3,981,850 | 9/1976 | Wisotsky et al. | 526/227 |
| 4,087,255 | 5/1978 | Wisotsky et al. | 44/62 |
| 4,156,434 | 5/1979 | Parker et al. | 44/62 |
| 4,178,950 | 12/1979 | Sweeney | 44/62 |
| 4,329,267 | 5/1982 | Riebel et al. | 523/323 |
| 4,608,411 | 8/1986 | Meunier et al. | 524/533 |

FOREIGN PATENT DOCUMENTS

| | | |
|---|---|---|
| 0906158 | 4/1987 | Belgium . |
| 0035686 | 9/1981 | European Pat. Off. . |
| 0099646 | 2/1984 | European Pat. Off. . |
| 0184048 | 6/1986 | European Pat. Off. . |
| 0196217 | 10/1986 | European Pat. Off. . |
| 1914765 | 11/1969 | Fed. Rep. of Germany . |
| 2261333 | 9/1975 | France . |
| 3616056 | 12/1986 | France . |
| 2572410 | 9/1987 | France . |
| 59-53593 | 3/1984 | Japan . |
| 59-53593 | 3/1984 | Japan . |
| 0900200 | 7/1962 | United Kingdom . |
| 1112808 | 5/1968 | United Kingdom . |
| 1263151 | 2/1972 | United Kingdom . |
| 2189251 | 10/1987 | United Kingdom . |

OTHER PUBLICATIONS

The Encyclopedia of Chemistry, Third Edition, Ed. Hampel, Van Nostrand Reinhold Company, New York pp. 146–148.
Comprehensive Polymer Science, Vol. 1, Allen et al., Pergamon Press, Oxford pp. 34–37.
Chemical Abstracts, 97, (1982) 128585q.
Patent Abstracts of Japan, Jul. 12, 1984, p. 233.
Derwent abstract of JP-A-59/53593.

Primary Examiner—William R. Dixon, Jr.
Assistant Examiner—J. Johnson
Attorney, Agent, or Firm—Curtis, Morris & Safford

[57] ABSTRACT

An agent for improving the flow properties of middle distillates, said agent being a solution consisting essentially of a solvent having a boiling point of at least 50° C. at 760 mm Hg and a graft copolymer formed from (a) as the grafting monomer, 20 to 80 percent by weight of an ester of methacrylic acid and a $C_8$ to $C_{15}$ alkanol, and (b) as the backbone polymer, from 80 to 20 percent by weight of an ethylene/vinyl acetate copolymer or of a terpolymer formed from ethylene, vinyl acetate, and a substituted olefin having form 3 to 50 carbon atoms, said backbone polymer having a reduced viscosity of 6 to 50 ml/g and degree of branching between 3 and 15 $CH_3$ groups per 100 $CH_2$ groups.

6 Claims, No Drawings

POLYMERIC FLUIDIZER FOR MIDDLE DISTILLATES

The present invention relates to compositions comprising an ethylene/vinyl acetate graft copolymer in a solvent, which compositions are useful as flow improvers for middle distillates.

THE PRIOR ART

Industry must increasingly make use of crude oils having relatively poor flow properties or a high pour point. As a rule, these properties are due to the content of paraffin in the oils, which content, on the other hand is conducive to a good viscosity-temperature behavior of the products made from such oils. (See Ullmanns *Encyklopadie der technischen Chemie*. 4th Edition, Vol. 20, page 548, Verlag Chemie, Weinheim, 1981).

Further processing of the crude oils in refineries yields different groups of products, which may vary with the crude oil process and with the refinery. The principal product groups are the fractions boiling at less than approximately 200° C. (gasoline); the next higher fraction (kerosene), boiling at up to about 250° C.; and, following it, the gas oil fraction, distilling over at up to approximately 350° C. The fractions which pass over above gasoline, in other words, kerosene and gas oil, are usually lumped together as "middle distillates" in refinery practice. (See Ullmanns, *op.cit.*, Vol. 10, pp. 643-648 and Kirk-Othmer, *Encyclopedia of Chemical Technology*, 3rd Edition, Vol. 17, pp. 257-271.)

The obvious solution to high paraffin content in the case of lubricating oil fractions, namely removal of some of the paraffins by solvent extraction at low temperatures, adds substantially to costs, particularly because it is energy intensive because the solvents have to be recovered and the extraction has to be carried out with cooling. This is compounded by the difficulties encountered in removing the paraffin wax. The industry therefore soon embarked on a search for appropriate additives that would lead to better flow properties and a lower pour point for petroleum oils and petroleum oil fractions, especially middle distillates.

Copolymers of ethylene and vinyl esters of $C_1$ to $C_4$ carboxylic acids, and particularly vinyl acetate (so-called "EVA" copolymers), containing from 15 to 40 percent by weight of vinyl esters have proved to be effective flow improvers for crude oils and middle distillates. (See British patent publication 900,202 and U.S. Pat. Nos. 3,567,639 and 3,048,497 re EVA copolymers.) With small amounts of additives, only EVA copolymers with relatively low molecular weights between 500 and 5000, and particularly with a specific degree of branching, exhibit significant effectiveness. (See British patent publication No. 900,202 and German patent No. 19 14 765.) European patent No. 0,099,646 claims ethylene/vinyl acetate copolymers having a low molecular weight. Terpolymerization with iso-olefins results in a specific degrees of branching from 5 to 15 $CH_3$ groups per 100 $CH_2$ groups.

European patent No. 0,184,048 teaches as pour point depressants terpolymers, having an average molecular weight of 400 to about 1200, of ethylene, 30 to 45 percent by weight of vinyl acetate, and a content of isobutylene corresponding to a degree of branching from 2 to about 15 $CH_3$ groups per 100 $CH_2$ groups.

German patent No. 36 16 056 relates to the use of ethylene termpolymers which contain, in addition to ethylene, from 0.5 to 20 percent by weight of diisobutylene and from 20 to 35 percent by weight of vinyl acetate and have an average molecular weight from 500 to 10000, as additives for petroleum oils and petroleum oil distillates. European patent No. 0,196,217 discloses a distillate fuel which has an improved cold filter plugging point and pour point and which contains, in addition to the distillate, from 10 to 2500 parts of a terpolymer of ethylene, unsaturated ester, and substituted olefin per million parts of distillate. The olefin may be diisobutylene, triisobutylene, tetraisobutylene, or mixtures thereof.

Japanese patent No. 53593/84 (application number 164 534/82) proposes low temperature flow improvers for petroleum oils obtained by grafting $C_3$ to $C_{21}$ alkyl esters of acrylic acid or methacrylic acid, or vinyl esters, or optionally substituted styrene, onto ethylene/vinyl acetate copolymers. The ethylene content of the polymers ranges from 50 to 90 percent by weight and their intrinsic viscosity at 30° C. in benzene is from 0.08 to 0.5 dl/g. The amount grafted is said to be between 20 and 300 percent by weight of the EVA coplymer. French patent No. 2,572,410 teaches that graft copolymers are known as additives for preventing paraffin deposits and for improving the flow properties of crude oils, which copolymers are composed of 5 to 95 percent by weight of a backbone polymer of ethylene and at least one unsaturated monomer selected from the group consisting of $C_2$ to $C_{18}$ vinyl esters, $C_1$ to $C_{22}$ alkyl esters of unsaturated monocarboxylic acids, and $\alpha,\beta$-unsaturated dicarboxylic acids or their esters or anhydrides, onto which homopolymers or copolymers of $\alpha,\beta$-unsaturated monocarboxylic acid esters with an alcohol radical having at least 12 carbon atoms are grafted.

THE OBJECT AND THE INVENTION

However, the prior art additives are not satisfactory in every respect. In particular, there is a need for flow improvers which fulfill their function efficiently and reliably in oils of specific origins and in specific fractions of these oils.

Experience has shown that not just any combinations of ethylene/vinyl acetate copolymers and alkyl methacrylates will satisfy technical requirements. It is important to select and make available combinations suitable for specific end uses. The present invention is concerned primarily with middle distillates, that is fractions which generally include gas oil (boiling range 170° C. to 350° C., and more particularly 225° C. to 350° C.; TBP (True Boiling Point) in conformity with ASTM D 2892), diesel fuels, aviation turbojet fuels, and heating oils.

As a rule, the middle distillates include fractions having a boiling range above 170° C., and preferably above 225° C. (See Winnacker-Küchler, 4th Edition, Vol. 5, Carl Hanser Verlag, Munich and Vienna, 1981.)

It has been found that the flow improvers of the invention meet industrial requirements to an unexpectedly high degree. The flow improvers of the invention, comprise graft polymers of polyalkyl methacrylates on ethylene/vinyl ester copolymers as a component of a solvent system. More specifically, the improvers contain, as much flow improving agents, graft polymers composed of (a) 20 to 80 percent by weight of alkyl methacrylate having from 8 to 15 carbon atoms in the alkyl group of the ester;

(b) 80 to 20 percent by weight of ethyl/vinyl acetate copolymers, preferably with 28 to 40 percent by weight of vinyl acetate, the original reduced viscosity of the ethylene/vinyl acetate copolymers (at 25° C. in xylene) ranging preferably from 6 to 50 ml/g, and more particularly from 6 to 30 ml/g, and the degree of branching being preferably between 3 and 15 $CH_3$ groups per 100 $CH_2$ groups; and a solvent having a boiling point of at least 50° C., and preferably greater than 100° C., at 760 mm Hg. As a rule, (a) and (b) will add up to 100 weight percent.

The solvent used should be inert to free radical initiated reactions and is preferably selected from the group consisting of hydrocarbons or cetane-number improvers, particularly alkyl nitrates and alkyl diglycol nitrates such as $C_5$ to $C_8$ alkyl nitrates, and especially primary amyl nitrate, cyclohexyl nitrate, isooctyl nitrate, or diethylene glycol nitrate (cf. Ullmanns, *op.cit.*. Vol. 12, page 577), or mixtures of such nitrates with each other or with hydrocarbons.

Illustrative of suitable hydrocarbons are aliphatic and aromatic distillates, including the pure solvent and cuts, for example comprising aliphatics (n-alkanes and isoalkanes), as well as aromatic cuts or reformates, having viscosities of up to 2 $mm^2/s$, and particularly kerosene having a boiling range of 180° C. to 210° C., for example, or the commercial product "Shell Sol" of Shell AG.

The graft polymer content of the flow improvers of the invention will generally range from 30 to 80 percent by weight of the solvent system.

THE GRAFT POLYMERS

The "backbone" polymer (b) is a copolymer of ethylene and vinyl acetate (EVA) which may further contain a third monomer component to make it a terpolymer, preferably having a vinyl acetate content from 28 to 40 percent by weight, and more particularly from 28 to 35 percent by weight. Suitable for use as a third component are, for example, further substituted olefins generally having from 3 to 50 carbon atoms, preferably 3 to 10 carbon atoms, per olefin unit, and particularly dienes such as isobutylene or diisobutylene. The EVA copolymers preferably have a relatively low number-average molecular weight, for example in the 400 to 10000 range, and more particularly in the 500 to 5000 range, as determined by osmometry, and more particularly by vapor-phase osmometry (cf. R. Vieweg *et al., Kunstoff-Handbuch [Plastics Handbook]*, Vol. I, pp. 328–341, Carl Hanser Verlag, Munich, 1975) or by gel permeation or size exclusion chromatography (cf. Ullmanns op cit., Vol. 5, pp. 166–171).

Values ranging from 6 to 30 ml/g, and more particularly from 10 to 20 ml/g, have proved to be appropriate for the reduced viscosity (based on DIN 1342, DIN 51562, and DIN 7745) of the EVA copolymers at 25° C. in xylene. A specific degree of branching also appears to be of importance. The degree of branching is preferably between 3 and 15, and more particularly between 6 and 9, $CH_3$ groups per 100 $CH_2$ groups. This is determined conventionally by H nuclear magnetic resonance spectroscopy.

The preparation of the copolymers (b) is known per se. It may be carried out by the procedure set forth in German patent No. 36 16 056, European patent No. 0,099,646, or German patent No. 19 14 756, for example. It is advantageously carried out by copolymerization of the monomers in an autoclave at temperatures ranging from 80° C. to 150° C. and pressures from 5 to 15 MPa, for example, in the presence of free radical initiators such as peroxides and in appropriate inert organic solvents.

Usable types are available commercially. As a rule, the grafting of component (a) onto the backbone polymer (b) is effected in keeping with known grafting methods. With regard to details of the preparation of graft copolymers, reference is made to the pertinent literature, for example Houben-Weyl, *Methoden der organischen Chemie,* 14/1, p. 110 ff.; *Block Copolymers,* D.C. Allport et al., Applied Science Publishers Ltd., London,. 1973; *Graft Copolymers,* H.A.I. Battaerd et al., Polymer Reviews, Vol. 16 (1967); and *Block and Graft Polymers,* W. J. Burlant et al., Reinhold Publishing Corporation, New York, 1960.

The monomers of the graft component (a) are, by definition, alkyl esters of methacrylic acid having from 8 to 15 carbon atoms in the alkyl group. Both iso- and n-alkyl groups are usable. Particularly well suited are the iso-$C_{10}$-methacrylates, whereas n-$C_{10}$-methacrylate is less well suited. Also well suited are the $C_{12}$ to $C_{14}$ alkyl methacrylates. The monomers may also be grafted on as a mixture.

The weight ratio of the graft component (a) to the backbone polymer (b) preferably ranges from 1:4 to 4:1, and more particularly from 1:1 to 3:1. Good ratios are 1(+1):1. The procedure may be as follows:

The backbone polymer, for example EVA or an ethylene/vinyl acetate/diisobutylene terpolymer, is advantageously introduced into a suitable polymerization vessel as an initial charge, dissolved in the solvent, for example kerosene. The amount of the solvent used will, of course, depend in some measure on its nature. In the case of kerosene, a weight ratio of backbone polymer (b) to solvent of 1:1, for example, may be used as a rule of thumb. Depending on the amount of the graft polymer, polymer contents of over 65 percent by weight will then usually be obtained. Dissolution is advantageously promoted by heating to $\pi° \pm 10°$ C., for example, with stirring. At an elevated temperature which makes allowances for the temperature of decomposition of the initiator used and which may be as high as 90° C., and under an inert gas such as nitrogen or argon, the monomers and an initiator are then added as a mixture, for example advantageously by means of a metering pump and over a period of time, such as $2 \pm \frac{1}{2}$ hours. Suitable initiators are commonly used free radical initiators, and in particular peroxy compounds such as peresters, for example tert.-butyl peroctoate. The initiator addition will generally amount to 0.5 to 5 percent, and preferably from 1 to 4 percent, by weight of the monomers. At the end of the addition, more initiator, about 15 percent by weight of the amount already used, is advantageously fed in. A total polymerization time from 8 to 16 hours will usually serve as a guide.

Any homopolymer formed during the polymerization of (a) can usually remain in the batch, which thus may be used further as is, without special purification.

THE FLOW IMPROVERS

In accordance with the invention, the flow improvers are relatively concentrated polymer solutions containing from 30 to 80 percent by weight of graft polymers in a solvent. They are advantageously added to the oils or oil fractions whose fluidity is to be improved in such amounts that they contain from 10 to 1000 ppm, and preferably from 50 to 300 ppm, of graft polymer. The effect of the flow improvers of the invention is particularly pronounced in middle distillates. In addition to the inventive flow improvers, other commonly used additives, such as antioxidants, dispersants, etc., as well as nozzle anti-fouling components, may be added to the oil fractions.

ADVANTAGES

The flow improvers of the invention are distinguished by outstanding effectiveness when used in relatively small amounts as additives. In middle distillates, they will lower the pour point and the temperature at which these fractions can still be filtered by 10° C. to 30° C. on the average.

A better understanding of the present invention and of its many advantages will be had from the following Examples, given by way of illustration.

The actual viscosity ($\eta$ act) is determined with a rotational viscometer in conformity with DIN 53018. The intrinsic viscosity is determined as specified in DIN 1342 or IZOD 1628-6. The cold filter plugging point (CFPP) is determined in conformity with DIN 51428. (See also, Journal of the Institute of Petroleum, 52, [510], pp 173-185 [1966].) This property designates the limit of filterability. The pour point (the lowest temperature at which a petroleum oil or petroleum oil distillate will still pour) is determined in conformity with DIN 51597 or ASTM D-97 (Pour Point Test).

All the ethylene/vinyl acetate copolymers and terpolymers used in the following Examples have a degree of branching between 3 and 15 $CH_3$ groups per 100 $CH_2$ groups.

EXAMPLES

(A) Preparation of graft polymers

EXAMPLE 1

750 g of an ethylene/vinyl acetate/diisobutylene terpolymer (61:28:11) (intrinsic viscosity at 25° C. in xylene=16 ml/g) are dissolved in 750 g of kerosene (180° C.-210° C.) by stirring at a temperature of 90° C. in a round bottomed flask equipped with a blade stirrer and reflux condenser. 750 g of iso-$C_{10}$-methacrylate and 11.25 g of tert.-butyl peroctoate are added to this solution under a nitrogen atmosphere over a period of 2 hours by means of a metering pump at 90° C. On completion of this addition, another 1.5 g. of tert.-butyl peroctoate are added. The total polymerization time is 16 hours.

The product contains 67 percent of polymer, is fluid at room temperature ($\delta$ act at 25° C.=2600 mPa.s; at 40° C.=890 mPa.s), and is whitish/cloudy. The freezing point is −10° C.

EXAMPLE 2

The same procedure is followed as in Example 1, except that 1500 g of iso-$C_{10}$-methacrylate and 22.5 g of tert.-butyl peroctoate are added to the solution of the ethylene/vinyl acetate/diisobutylene terpolymer over a period of 2 hours.

The product contains 75 percent of polymer, is fluid at room temperature ($\eta$ act at 25° C.=9600 mPa.s; at 40° C.=2700 mPa.s), and is whitish/cloudy. The freezing point is +3° C.

EXAMPLE 3

The procedure described in Example 2 is followed, except that 750 g of an ethylene/vinyl acetate copolymer (vinyl acetate content, 32 percent by weight; intrinsic viscosity [at 25° C. in xylene=18.9 ml/g] are dissolved in 750 g of kerosene.

The product contains 75 percent by weight of polymer, is fluid at room temperature (22° C.) ($\eta$ act at 25° C.=36500 mPa.s) and is whitish/cloudy. The freezing point is =+4° C.

EXAMPLES 4–18

The preparatory procedure followed is the same as in Example 2. In each Example, different methacrylates are copolymerized with EVA in a weight ratio of 1:2.

TABLE 1

| Example | Methacrylates | Polymer content, % | Viscosity | Freezing point, °C. | Appearance |
|---|---|---|---|---|---|
| 4 | $C_{12-14}$ methacrylates, unbranched 55% $C_{12}$ 45% $C_{14}$ | 75 | 17,800 | −2 | Whitish/cloudy |
| 5 | $C_{12-15}$ methacrylates 23% branched | 75 | 5,100 | −1 | whitish/cloudy |
| 6 | n-$C_{10}$-methacrylate | 75 | 17,700 | +4 | Whitish/cloudy |
| 7 | iso-$C_{13}$-methacrylate | 75 | 46,600 | +5 | Whitish/cloudy |
| 8 | $C_{12-15}$-methacrylates 60% branched | 75 | 5,800 | +2 | Whitish/cloudy |

(B) Flow-improving effect

The flow improvers of Examples 1 to 8 are added to a number of products from the middle-distillate range.

The products designated DK1 to DK7 are identified below.

DK1=Texaco heating oil EL
DK2=Gulf diesel fuel
DK3=Lindsay Refinery product G1W2
DK4=Lindsay Refinery product G1W3
DK5=Ethyl BSO fuel
DK6=BP D 12
DK7=Lindsay Refinery product G2W4

TABLE 2

COLD FILTER PLUGGING POINT (CFPP)
OF MIDDLE DISTILLATES
(determined in conformity with DIN 51,428
or the Journal of the Institute of Petroleum,
vol. 52 [510], pp. 173-185 [1966])

| Ex- | Additive, ppm, | DK1 (+2)* | DK2 (−2)* | DK3 (−7)* |
|---|---|---|---|---|

TABLE 2-continued

COLD FILTER PLUGGING POINT (CFPP) OF MIDDLE DISTILLATES
(determined in conformity with DIN 51,428 or the Journal of the Institute of Petroleum, vol. 52 [510], pp. 173-185 [1966])

| Example | Additive, ppm, based on EVA | 37.5 | 50 | 65 | 75 | 100 | 65 | 100 | 133 | 200 | 100 | 133 | 200 |
|---|---|---|---|---|---|---|---|---|---|---|---|---|---|
| 9 | EVA 1 | −1 | −9 | | −12 | −16 | | −13 | | −17 | | | −18 |
| 10 | EVA 2 | −9 | −12 | | −13 | | | | | −18 | | | −17 |
| 11 | As per Example 1 | −10 | −15 | −19 | | −26 | −15 | −17 | | | −16 | | |
| 12 | As per Example 2 | −13 | −17 | | −22 | | | −13 | −18 | | −19 | | |
| 13 | As per Example 3 | −12 | | | | | | | | | | | |
| 14 | As per Example 4 | −14 | −16 | | | | | −11 | | | | | |
| 15 | As per Example 5 | | −15 | | | | | −19 | | | | | |
| 16 | As per Example 6 | −11 | | | | | | −17 | | | | | |
| 17 | As per Example 7 | −8 | | | | | | | | | | | |
| 18 | As per Example 8 | −13 | −17 | | | | −14 | −18 | | | | | |

| Example | Additive, ppm, based on EVA | DK4 (−7)* | | | DK5 (−8)* | | | DK6 (−3)* | | | DK7 (−4)* | | |
|---|---|---|---|---|---|---|---|---|---|---|---|---|---|
| | | 100 | 133 | 200 | 100 | 133 | 200 | 50 | 67 | 100 | 100 | 133 | 200 |
| 9 | EVA 1 | | −11 | −12 | | | −23 | −11 | | −14 | | | −9 |
| 10 | EVA 2 | | −14 | | | | −21 | −11 | | −14 | | | −16 |
| 11 | As per Example 1 | −14 | | | −19 | | | | −16 | | | −14 | |
| 12 | As per Example 2 | −13 | | | −19 | | | −17 | | | −10 | | |
| 13 | As per Example 3 | | | | | | | | | | | | |
| 14 | As per Example 4 | −15 | | | | | | −15 | | | | | |
| 15 | As per Example 5 | | | | | | | | | | | | |
| 16 | As per Example 6 | | | | | | | | | | | | |
| 17 | As per Example 7 | | | | | | | | | | | | |
| 18 | As per Example 8 | | | | −26 | | | −15 | | | | | |

*The values in parentheses indicate the CFPP in °C. without the additive

What is claimed is:

1. An agent for improving the flow properties of middle distillates consisting essentially of a solvent having a boiling point of at least 50° C. at 760 mm Hg and a graft copolymer formed from
    (a) as a grafting monomer, 20 to 80 percent by weight of methacrylic acid esters of $C_8$ to $C_5$ alkanols, and
    (b) as a backbone polymer, 80 to 20 percent by weight of a member selected from the group consisting of ethylene/vinyl acetate copolymers and terpolymers formed from ethylene, vinyl acetate, and a olefin having from 3 to 50 carbon atoms, said member having a reduced viscosity from 6 to 50 ml/g at 25° C. in xylene and having a degree of branching between 3 and 15 $CH_3$ groups per 100 $CH_2$ groups.

2. An agent as in claim 1 wherein said ethylene/vinyl acetate copolymer has a vinyl acetate content from 28 to 40 percent by weight.

3. An agent as in claim 2 wherein the reduced viscosity of said ethylene/vinyl acetate copolymer is from 6 to 30 ml/g.

4. An agent as in claim 1 wherein (a) is a methacrylic acid ester of a $C_{10}$ to $C_{15}$ alkanol.

5. An agent as in claim 1 wherein (a) is a methacrylic acid ester of iso-$C_{10}$-alkanol.

6. An agent as in claim 1 wherein the ratio by weight of (a) to (b) is from 1:1 to 3:1.

* * * * *

UNITED STATES PATENT AND TRADEMARK OFFICE
CERTIFICATE OF CORRECTION

PATENT NO. : 4,932,980
DATED : June 12, 1990
INVENTOR(S) : Mueller et al.

It is certified that error appears in the above-identified patent and that said Letters Patent is hereby corrected as shown below:

Column 6, line 4, replace "$\delta$" (delta) by -- $\eta$ -- (eta).

Columns 7 and 8, in Example 11 in the top portion of Table 2, seventh numbered column from the left ("100"), replace "-17" by -- -15 --;

eighth numbered column from the left ("133"), enter -- -17 --;

tenth numbered column from the left ("100"), delete "-16";

eleventh numbered column from the left ("133"), enter -- -16 --.

Column 7, line 37 (Claim 1, line 6), replace "$C_5$" by -- $C_{15}$ --.

Signed and Sealed this

Eighth Day of October, 1991

Attest:

HARRY F. MANBECK, JR.

*Attesting Officer*  *Commissioner of Patents and Trademarks*